(12) United States Patent
Arai et al.

(10) Patent No.: US 12,278,679 B2
(45) Date of Patent: Apr. 15, 2025

(54) WIRELESS COMMUNICATION APPARATUS AND WIRELESS COMMUNICATION METHOD

(71) Applicant: NIPPON TELEGRAPH AND TELEPHONE CORPORATION, Tokyo (JP)

(72) Inventors: Takuto Arai, Musashino (JP); Daisei Uchida, Musashino (JP); Tatsuhiko Iwakuni, Musashino (JP); Shuki Wai, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/270,556

(22) PCT Filed: Feb. 2, 2021

(86) PCT No.: PCT/JP2021/003665
§ 371 (c)(1),
(2) Date: Jun. 30, 2023

(87) PCT Pub. No.: WO2022/168143
PCT Pub. Date: Aug. 11, 2022

(65) Prior Publication Data
US 2024/0088960 A1    Mar. 14, 2024

(51) Int. Cl.
*H04B 7/06* (2006.01)
*H04B 7/0452* (2017.01)
*H04B 17/373* (2015.01)

(52) U.S. Cl.
CPC ......... *H04B 7/0617* (2013.01); *H04B 7/0452* (2013.01); *H04B 17/373* (2015.01)

(58) Field of Classification Search
CPC .. H04B 7/0617; H04B 7/0452; H04B 17/373; H04B 7/0695; H04W 16/28
(Continued)

(56) References Cited

U.S. PATENT DOCUMENTS

2019/0074874 A1    3/2019   Obara et al.
2019/0372631 A1    12/2019  Taira et al.
(Continued)

FOREIGN PATENT DOCUMENTS

EP    3419326 A1    12/2018
JP    2017163497 A   9/2017
(Continued)

OTHER PUBLICATIONS

NTT DOCOMO, INC., "Docomo 6G white paper version 2.0", Jul. 2020.

*Primary Examiner* — Fitwi Y Hailegiorgis

(57) ABSTRACT

A wireless communication apparatus includes a terminal selection unit that selects one or more user terminals, a prediction unit that derives a prediction value of an interference amount of a stream group transmitted from a plurality of antennas for the selected one or more user terminals, a collection unit that, when the prediction value of the interference amount is less than a threshold value, collects reception power values of streams included in the stream group from the selected one or more user terminals, an antenna selection unit that selects the plurality of streams in descending order of reception power values and selecting the plurality of antennas associated with the plurality of selected streams, and a transmission unit that transmits the plurality of selected streams by beam forming using the plurality of selected antennas.

8 Claims, 6 Drawing Sheets

(58) Field of Classification Search
USPC .......................................................... 375/267
See application file for complete search history.

(56) References Cited

U.S. PATENT DOCUMENTS

| | | |
|---|---|---|
| 2021/0392524 A1 | 12/2021 | Ishihara et al. |
| 2022/0038166 A1 | 2/2022 | Maruta |
| 2022/0131588 A1* | 4/2022 | Elshafie ............... H04B 7/0626 |

FOREIGN PATENT DOCUMENTS

| | | |
|---|---|---|
| JP | 2018011249 A | 1/2018 |
| JP | 2019513317 A | 5/2019 |
| WO | WO-2017221291 A1 | 12/2017 |
| WO | WO-2020040001 A1 | 2/2020 |
| WO | WO-2020066143 A1 | 4/2020 |

* cited by examiner

| USER TERMINAL 5-1 | CANDIDATE OF STREAM | 7-3 | 7-7 | 7-5 | 7-1 |
|---|---|---|---|---|---|
| | RECEPTION POWER VALUE | −74dB | −77dB | −79dB | −83dB |
| | ANTENNA NUMBER | 4-3 | 4-7 | 4-5 | 4-1 |
| | ADDITION ORDER | 2 | − | − | 8 |
| USER TERMINAL 5-2 | CANDIDATE OF STREAM | 7-6 | 7-5 | 7-7 | 7-4 |
| | RECEPTION POWER VALUE | −73dB | −75dB | −76dB | −81dB |
| | ANTENNA NUMBER | 4-6 | 4-5 | 4-7 | 4-4 |
| | ADDITION ORDER | 1 | 3 | 4 | 7 |
| USER TERMINAL 5-3 | CANDIDATE OF STREAM | 7-12 | 7-9 | 7-5 | 7-8 |
| | RECEPTION POWER VALUE | −78dB | −79dB | −81dB | −84dB |
| | ANTENNA NUMBER | 4-12 | 4-9 | 4-5 | 4-8 |
| | ADDITION ORDER | 5 | 6 | − | − |

FIG. 2

WIRELESS COMMUNICATION APPARATUS AND WIRELESS COMMUNICATION METHOD

CROSS-REFERENCE TO RELATED APPLICATIONS

This application is a 371 National Stage of International Application No. PCT/JP2021/003665, filed on Feb. 2, 2021. The entire disclosure of the above application is incorporated herein by reference.

TECHNICAL FIELD

The present invention relates to a wireless communication apparatus and a wireless communication method.

BACKGROUND ART

In the fifth generation mobile communication system (5G), a radio wave of a high frequency band (millimeter wave band) is used for communication. In a future wireless system (for example, a sixth generation mobile communication system), it is assumed that a radio wave of a higher frequency band capable of securing a wider bandwidth is used so as to improve the communication capacity.

Generally, the propagation loss of radio waves in a high frequency band is large. Furthermore, the straightness of the radio waves in the high frequency band is high. Therefore, a wireless communication system (a distributed antenna system) for communicating by using a plurality of antennas arranged in a distributed manner in order to cover a communication area has been studied (refer to NPD 1).

The distributed antenna system uses a plurality of antennas arranged in a distributed manner to execute single user MIMO (Single User-Multi-Input Multi-Output: SU-MIMO), and multi-user MIMO (Multi User-Multi-Input Multi-Output: MU-MIMO). Accordingly, it is possible for the distributed antenna to improve the communication capacity.

In PTD 1, there has been proposed a base station which determines the number and parameters of streams to be transmitted to each mobile station on the basis of each channel estimation value between the base station and each mobile station in a wireless communication system including a base station (a wireless communication apparatus) using multi-user MIMO and a plurality of mobile station (user terminals). In PTD 1, the base station assigns the number of streams to be transmitted from an antenna to the mobile station to each mobile station by applying a Greedy method or the like to each channel estimation value. Accordingly, it is possible to improve the communication capacity.

CITATION LIST

Patent Document

[PTD 1] Japanese Patent Application Laid-open No. 2017-163497

Non Patent Document

[NPD 1] NTT DOCOMO, INC., "Docomo 6G white paper version 2.0", July, 2020

SUMMARY OF INVENTION

Technical Problem

In a wireless communication system using radio waves in a high frequency band for communication, it is required to suppress an increase in processing load from the viewpoint of suppression of processing delay and simplification of device control. However, it is not desirable for the base station to collect a plurality of channel estimation values between all the antennas which are arranged in a distributed manner and each user terminal from the viewpoint of suppressing the increase in processing load. Further, it is not desirable to control streams to be allocated to the user terminal based on the plurality of channel estimation values from the viewpoint of suppressing the increase in processing load. As described above, when the processing load is increased, the communication capacity may not be improved.

In view of such circumstances, an objective of the present invention is to provide a wireless communication apparatus and a wireless communication method capable of improving the communication capacity while suppressing the increase in processing load.

Solution to Problem

An aspect of the present invention is a wireless communication apparatus including a terminal selection unit that selects one or more user terminals, a prediction unit that derives a prediction value of an interference amount of a stream group transmitted from a plurality of antennas for the selected one or more user terminals, a collection unit that, when the prediction value of the interference amount is less than a threshold value, collects reception power values of beams of streams included in the stream group from the selected one or more user terminals, an antenna selection unit that selects the plurality of streams in descending order of the reception power values and selects the plurality of antennas associated with the plurality of selected streams, and a transmission unit that transmits the plurality of selected streams by beam forming using the plurality of selected antennas.

An aspect of the present invention is a wireless communication method executed by a wireless communication apparatus, the wireless communication method includes a terminal selection step of selecting one or more user terminals, a prediction step of deriving a prediction value of an interference amount of a stream group transmitted from a plurality of antennas for the selected one or more user terminals, a collection step of collecting, when the prediction value of the interference amount is less than a threshold value, reception power values of beams of streams included in the stream group from the selected one or more user terminals, an antenna selection step of selecting the plurality of streams in descending order of the reception power values and selecting the plurality of antennas associated with the plurality of selected streams, and a transmission step of transmitting the plurality of selected streams by beam forming by using the plurality of selected antennas.

Advantageous Effects of Invention

According to the present invention, it is possible to improve the communication capacity while suppressing the increase in processing load.

BRIEF DESCRIPTION OF DRAWINGS

FIG. 2 is a diagram showing an additional example of streams to a group of streams to be spatially multiplexed according to the embodiment.

DESCRIPTION OF EMBODIMENTS

Figure 1:
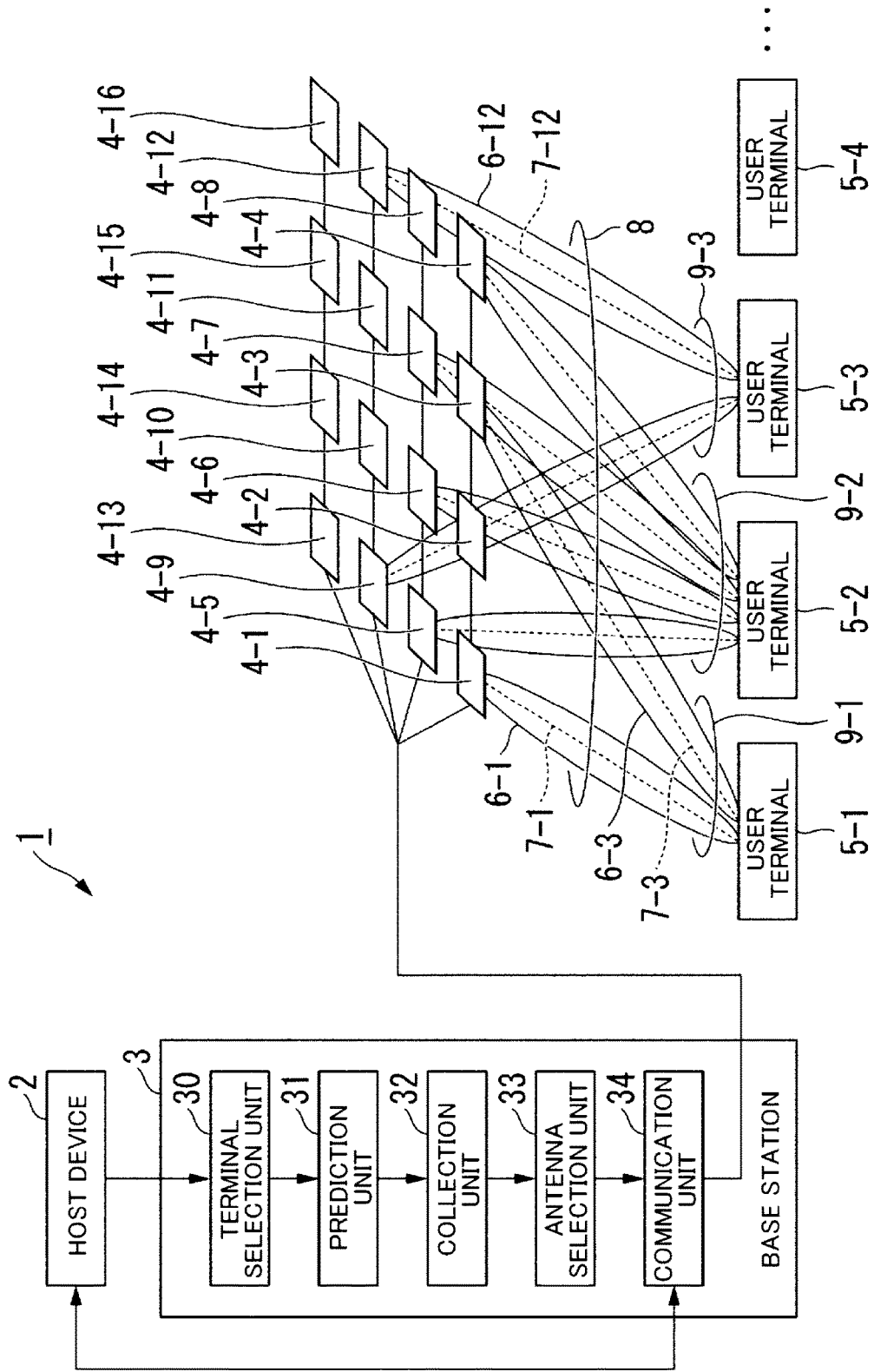
FIG. 1 is a diagram showing a configuration example of a wireless communication system according to an embodiment.

An embodiment of the present invention will be described in detail with reference to the drawings.

Overview

A wireless communication system of an embodiment is a system (a distributed antenna system) that wirelessly communicates streams (data sequence) using at least some of all antennas arranged in a distributed manner. In the wireless communication system, one stream for each antenna is transmitted to a user terminal using one beam for each antenna. Therefore, when a plurality of stream (stream groups) is assigned to the user terminal, a plurality of assigned streams (beams) is transmitted from a plurality of antennas toward the user terminal.

Here, the base station of the wireless communication system selects a plurality of antennas for transmitting the plurality of assigned streams from among all the antennas arranged in the distributed manner. The base station derives a prediction value of an interference amount between streams transmitted from the plurality of selected antennas by using a predetermined statistical method based on a combination of the plurality of selected antennas. In addition, the base station judges whether the derived prediction value is less than a predetermined threshold value before transmission of the streams.

When it is judged that the predicted value of the interference amount between the streams is less than the predetermined threshold value, the base station performs beam search for each antenna arranged in the distributed manner so that each user terminal can measure reception power values of beams of streams. Here, the base station transmits a beam of the power measurement signal to each user terminal in a communication area by using each antenna. Each user terminal feeds back the maximum reception power value of the beam of the power measurement signal transmitted for each antenna to the base station. The base station collects the maximum reception power value of the beam of the transmitted signal for power measurement from each user terminal in the communication area. That is, the base station collects the maximum reception power value for each antenna which has transmitted the beam of the power measurement signal from each user terminal in the communication area. The reception power value of the beam of the power measurement signal transmitted from the antenna corresponds to the reception power value of the beam of the stream transmitted from the same antenna. The reception power value is an index which is simpler than the channel estimation value (index of no higher processing load).

The base station assigns one or more streams to one or more selected user terminals in a range of the number of streams that can be simultaneously transmitted by the base station for downlink in response to the assignment request transmitted from the host device. Here, the base station allocates the number of streams to one or more selected user terminals on the basis of the collected reception power value. The base station may assign the number of streams to one or more selected user terminals on the basis of the collected reception power values for the uplink.

The base station selects a plurality of antennas from all the antennas arranged in the distributed manner by prioritizing an antenna in which a signal-to-noise ratio of the stream is high. Here, all the antennas arranged in the distributed manner may be selected, or a part of all the antennas arranged in the distributed manner may be selected.

When it is judged that the prediction value of the interference amount between the streams is less than the predetermined threshold value, the base station transmits a stream group to one or more selected user terminals by using a radio wave (a wireless signal) of a high frequency band transmitted from the plurality of selected antennas. Here, the wireless communication system executes beam forming, thereby reducing the interference amount between streams. Accordingly, it is possible to improve the communication capacity while suppressing the increase in the processing load.

Embodiment

FIG. 1 is a diagram showing a configuration example of a wireless communication system 1. The wireless communication system 1 is a system (a distributed antenna system) for wirelessly communicating the streams by using at least some of all antennas arranged in the distributed manner. The wireless communication system 1 includes a host device 2, a base station 3, a plurality of antennas 4, and one or more user terminals 5.

The plurality of antennas 4 (super-distributed antennas) are extended from the base station 3 and arranged in the distributed manner in the communication area. The base station 3 and each antenna 4 are connected to each other by using, for example, an optical fiber or a coaxial cable. An optical fiber may transmit optical signals between the base station 3 and each antenna 4 by using an analogue RoF (a Radio-over-Fiber). In FIG. 1, the wireless communication system 1 includes, for example, 16 antennas 4. The antenna 4 includes a plurality of antenna elements. In addition, the user terminal 5 includes one or more antenna elements.

The host device 2 is an information processing device, for example, a server device. The host device 2 transmits the candidates of the streams (data sequence) transmitted from the antenna 4 to the base station 3.

The base station 3 performs centralized control of the operation of each antenna 4 arranged in the distributed manner. The base station 3 selects a plurality of antennas 4 from all the antennas 4 arranged in the distributed manner. The base station 3 transmits a stream group 8 subjected to spatial multiplexing to one or more user terminals 5 by using the selected plurality of antennas 4. Here, the base station 3 executes beam forming by using a plurality of antenna elements provided in the antenna 4. Thus, the gain in the high frequency band is secured.

Note that both the base station 3 and the user terminal 5 may execute beam forming. Further, the host device 2 may acquire a plurality of streams from the base station 3 by uplink transmission.

The base station 3 executes at least one of single user MIMO and multi-user MIMO. The plurality of antennas 4 simultaneously transmit the stream group 8 subjected to spatial multiplexing (a plurality of streams) to a plurality of user terminals 5. In this way, the base station 3 executes multi-user MIMO for the downlink. Similarly, the plurality of user terminals 5 may simultaneously transmit the stream group subjected to spatial multiplexing toward the plurality of antennas 4. In this way, the base station 3 may perform multi-user MIMO on the uplink.

The plurality of antennas 4 simultaneously transmit the stream group 9 subjected to spatial multiplexing (a plurality of streams) toward a single user terminal 5. In FIG. 1, the antenna 4-1 transmits the stream 7-1 to the user terminal 5-1 by using the beam 6-1. The antenna 4-3 transmits the stream 7-3 to the user terminal 5-1 by using the beam 6-3. In this way, the base station 3 executes single user MIMO for the downlink. Similarly, the single user terminal 5 may simultaneously transmit the stream group subjected to spatial multiplexing toward the plurality of antennas 4. In this way, the base station 3 may perform single user MIMO on the uplink.

The stream group 8 is a stream group of multi-user MIMO. Note that an upper limit of the number of streams 7 simultaneously communicable in the multi-user MIMO is determined on the basis of a parameter representing the maximum value of the number of layers of the multi-user MIMO.

The stream group 9 is a stream group of single user MIMO. The upper limit of the number of streams 7 capable of simultaneously communicating in the single user MIMO is determined based on a parameter representing the maximum value of the number of layers of the single user MIMO.

Next, the configuration example of the base station 3 will be described.

The base station 3 includes a terminal selection unit 30, a prediction unit 31, a collection unit 32, an antenna selection unit 33, and a communication unit 34 (a transmission unit, and a reception unit).

The terminal selection unit 30 acquires identifiers of a plurality of streams from the host device 2 as an assignment request of a downlink stream. The terminal selection unit 30 manages candidates of streams to be assigned to the user terminal 5 for the identifiers of the plurality of acquired streams. That is, the terminal selection unit 30 selects one or more user terminals 5 from among the plurality of user terminals 5 in the communication area on the basis of the identifier of the stream.

For example, the terminal selection unit 30 selects the user terminal 5 on the basis of a predetermined index such as a rank index (Rank Indicator: RI) and a predetermined scheduling processing. For example, the terminal selection unit 30 may select the user terminal 5 on the basis of the proportional fairness (PF) and a predetermined scheduling processing.

For example, the terminal selection unit 30 may select the user terminal 5 in order from the user terminal 5 having high reception power of the stream transmitted from the antenna 4. For example, the terminal selection unit 30 may select the user terminals 5 having similar reception power value of beam of stream transmitted from the antenna 4.

For example, the terminal selection unit 30 may select a plurality of user terminals 5 on the basis of a positional relationship or the like between the user terminals 5 so as to reduce an interference amount between streams between the user terminals 5. For example, the terminal selection unit 30 may select user terminals 5 which are separated from each other by a predetermined distance or more so that the amount of interference between streams is reduced between the user terminals 5.

For example, the terminal selection unit 30 may select the number of user terminals 5 equal to or more than the maximum value of the number of layers of multi-user MIMO. For example, the terminal selection unit 30 may select the number of user terminals 5 less than the maximum value of the number of layers of multi-user MIMO.

The prediction unit 31 acquires data representing the selected one or more user terminals 5 (for example, an identifier of the terminal) from the terminal selection unit 30. The prediction unit 31 derives a prediction value of an interference amount of a stream group transmitted from the plurality of antennas 4 for one or more selected user terminals 5. For example, the prediction unit 31 derives the prediction value of the interference amount between streams of the user terminal 5 for the selected single user terminal 5. For example, the prediction unit 31 derives the prediction value of the interference amount between streams of the plurality of user terminals 5 for the plurality of selected user terminals 5.

The prediction unit 31 judges whether or not the prediction value of the interference amount of the stream group is less than the predetermined threshold value. When it is judged that the prediction value of the interference amount of the stream group is equal to or more than the predetermined threshold value, the terminal selection unit 30 may re-perform processing for selecting the user terminal 5 until it is judged that the prediction value of the interference amount of the stream group is less than the predetermined threshold value.

The prediction unit 31 derives the prediction value of the interference amount between streams by using a predetermined statistical method based on a combination of a plurality of antennas 4 and a plurality of stream (beams) to be transmitted. The prediction unit 31 may derive the prediction value of the interference amount between streams by using the predetermined statistical method based on a positional relationship of the plurality of antennas 4 and a beam width corresponding to the number of antenna elements for each antenna 4.

Note that the terminal selection unit 30 may select the user terminal 5 so that the interference amount between the streams is reduced based on the derived prediction value.

When it is judged that the prediction value of the interference amount is less than the predetermined threshold value, the collection unit 32 collects a reception power value of a beam of a power measurement signal transmitted from each antenna 4 having a possibility of transmitting the stream to each selected user terminal 5 by feedback or the like from each selected user terminal 5. The antenna 4 having the possibility of transmitting the stream is an antenna 4 previously associated with the identifier of the acquired stream. Note that, as described above, the reception power value of the beam of the power measuring signal transmitted from the antenna 4 corresponds to the reception power value of the beam of the stream transmitted from the same antenna 4.

The antenna selection unit 33 selects a plurality of streams from the candidates of the streams in the descending order of reception power values of the beams of the streams. That is, the antenna selection unit 33 preferentially selects a stream indicating the maximum reception power value from among stream candidates determined by identifiers of a plurality of streams acquired from the host device 2 on the basis of the association between the antenna 4 and the stream 7.

The antenna selection unit 33 selects the antenna 4 associated with the selected stream 7. Here, the antenna selection unit 33 does not select the antenna 4 (resource) in an overlapping manner. When the antennas 4 are selected in the overlapping manner, the antenna selection unit 33 excludes the stream 7 selected later from candidates of the stream 7 added to the stream group 8 to be spatially multiplexed.

The antenna selection unit 33 selects the antenna 4 for transmitting the stream 7 until the number of streams 7 in the stream group 8 to be spatially multiplexed reaches the maximum value of the number of layers of multi-user MIMO or until the remaining of the candidates of the stream disappears. In this manner, the antenna selection unit 33 determines assignment (allocation) of the stream 7 to each user terminal 5.

Note that when the number of streams in the stream group to be spatially multiplexed does not reach the maximum value of the number of layers of multi-user MIMO and the remaining of the candidates of the streams disappears, the terminal selection unit 30 additionally selects the user terminal 5, and the antenna selection unit 33 may add a candidate of the stream addressed to the user terminal 5 to the stream group 8.

The communication unit 34 (the transmission unit and the reception unit) requests downlink transmission of the plurality of selected streams to the host device 2. The communication unit 34 acquires the plurality of selected streams from the host device 2. The communication unit 34 transmits the plurality of selected streams by beam forming using the plurality of selected antennas 4.

Next, the antenna selection unit 33 will be described in detail. FIG. 2 is a diagram showing an example of addition of the stream 7 to the stream group 8 to be spatially multiplexed (an example of assignment of the stream to the user terminal). In FIG. 2, the selected user terminal 5 includes, as an example, a user terminal 5-1, a user terminal 5-2, And a user terminal 5-3.

The antenna selection unit 33 extracts the number of the antenna 4 (the antenna number) having the possibility of transmitting the stream to each user terminal 5 from the numbers of all the antennas 4 arranged in the distributed manner by search processing. That is, the antenna selection unit 33 extracts the number of the antenna 4 associated with the candidate of the stream from the numbers of all the antennas 4 arranged in the distributed manner.

In a data table shown in FIG. 2, the reception power value and the antenna number are associated with each other on the basis of the result of beam search executed in advance by using the beam of the power measurement signal transmitted from each antenna 4. In addition, the candidate of the stream and the antenna number are associated with each other, for example, on the basis of a positional relationship between the user terminal 5 which is destination of the stream and the antenna 4. Thus, the candidate of the stream and the reception power value are associated with each other on the basis of the antenna number.

The antenna selection unit 33 extracts, as an example, an antenna 4-3 associated with a stream 7-3, an antenna 4-7 associated with a stream 7-7, an antenna 4-5 associated with a stream 7-5 and an antenna 4-1 associated with a stream 7-1 from the plurality of antennas 4 arranged in the distributed manner for a user terminal 5-1.

The antenna selection unit 33 extracts, as an example, an antenna 4-6 associated with a stream 7-6, an antenna 4-5 associated with a stream 7-5, an antenna 4-7 associated with a stream 7-7 and an antenna 4-4 associated with a stream 7-4 from the plurality of antennas 4 arranged in the distributed manner for a user terminal 5-2.

The antenna selection unit 33 extracts, as an example, an antenna 4-12 associated with a stream 7-12, an antenna 4-9 associated with a stream 7-9, an antenna 4-5 associated with a stream 7-5 and an antenna 4-8 associated with a stream 7-8 from the plurality of antennas 4 arranged in the distributed manner for a user terminal 5-3.

The antenna selection unit 33 extracts a reception power value of each selected user terminal 5 from a plurality of reception power values collected from the plurality of user terminals 5. Here, since the maximum value of the number of layers of the single user MIMO is 4, the antenna selection unit 33 extracts the reception power value of the stream for each user terminal 5 for four or less stream candidates.

In this manner, in FIG. 2, the "stream candidate", the "reception power value", the "antenna number" and the "addition order" are associated with each selected user terminal 5 in the form of a data table.

In FIG. 2, the maximum value of the number of layers of the single user MIMO is 4. Therefore, the number of stream candidates is four for each user terminal 5. Further, the maximum value of the number of layers of the multi-user MIMO is 8. Therefore, the antenna selection unit 33 adds eight or less streams selected from the candidates of the streams to the stream group 8.

The antenna selection unit 33 adds the stream candidate to the stream group 8 to be spatially multiplexed in the descending order of the associated reception power values. Here, when there are a plurality of stream candidates indicating the same reception power value, the antenna selection unit 33 may select the stream at random from the stream candidates. In addition, the antenna selection unit 33 may preferentially select the stream candidate of the user terminal 5 having a small number of assigned streams 7 from among the stream candidates.

The antenna selection unit 33 adds a stream 7-6 indicating a first largest reception power value "−73 dB" among the candidates of the stream to the stream group 8 to be spatially multiplexed. In addition, the antenna selection unit 33 excludes the added stream 7-6 from the candidates of the stream.

The antenna selection unit 33 adds a stream 7-3 indicating a second largest reception power value "−74 dB" among the candidates of the stream to the stream group 8 to be spatially multiplexed. The antenna selection unit 33 adds a stream 7-5 indicating a third largest reception power value "−75 dB" among the candidates of the stream to the stream group 8 to be spatially multiplexed. The antenna selection unit 33 adds a stream 7-7 indicating a fourth largest reception power value "−76 dB" among the candidates of the stream to the stream group 8 to be spatially multiplexed.

The antenna selection unit 33 selects a plurality of antennas 4 for transmitting the plurality of selected streams 7 so as not to overlap among all antennas 4 in the communication area. For example, the antenna selection unit 33 does not add a stream 7-7 indicating a fifth largest reception power value "−77 dB" among the stream candidates to the stream group 8 to be spatially multiplexed. This is because the antenna 4-7 associated with the stream 7-7 indicating the fifth largest reception power value "−77 dB" has been selected as the antenna 4-7 associated with the stream 7-7 indicating the fourth largest reception power value "−76 dB" among the candidates of the stream. When the candidate of the stream associated with the selected antenna 4 is selected, the antenna selection unit 33 does not add the candidate of the stream to the stream group 8 but excludes the candidate of the stream from an addition object to the stream group 8.

In FIG. 2, when the stream 7-1 indicating the reception power value "−83 dB" is added to the stream group 8, the number of streams to be spatially multiplexed reaches the maximum value "8" of the number of layers of the multi-user MIMO. Thus, the assignment processing of the stream 7 to the selected user terminal 5 is terminated without selecting any remaining candidate among the candidates of the stream.

Next, the operation of the wireless communication system 1 will be described.

Figure 3:
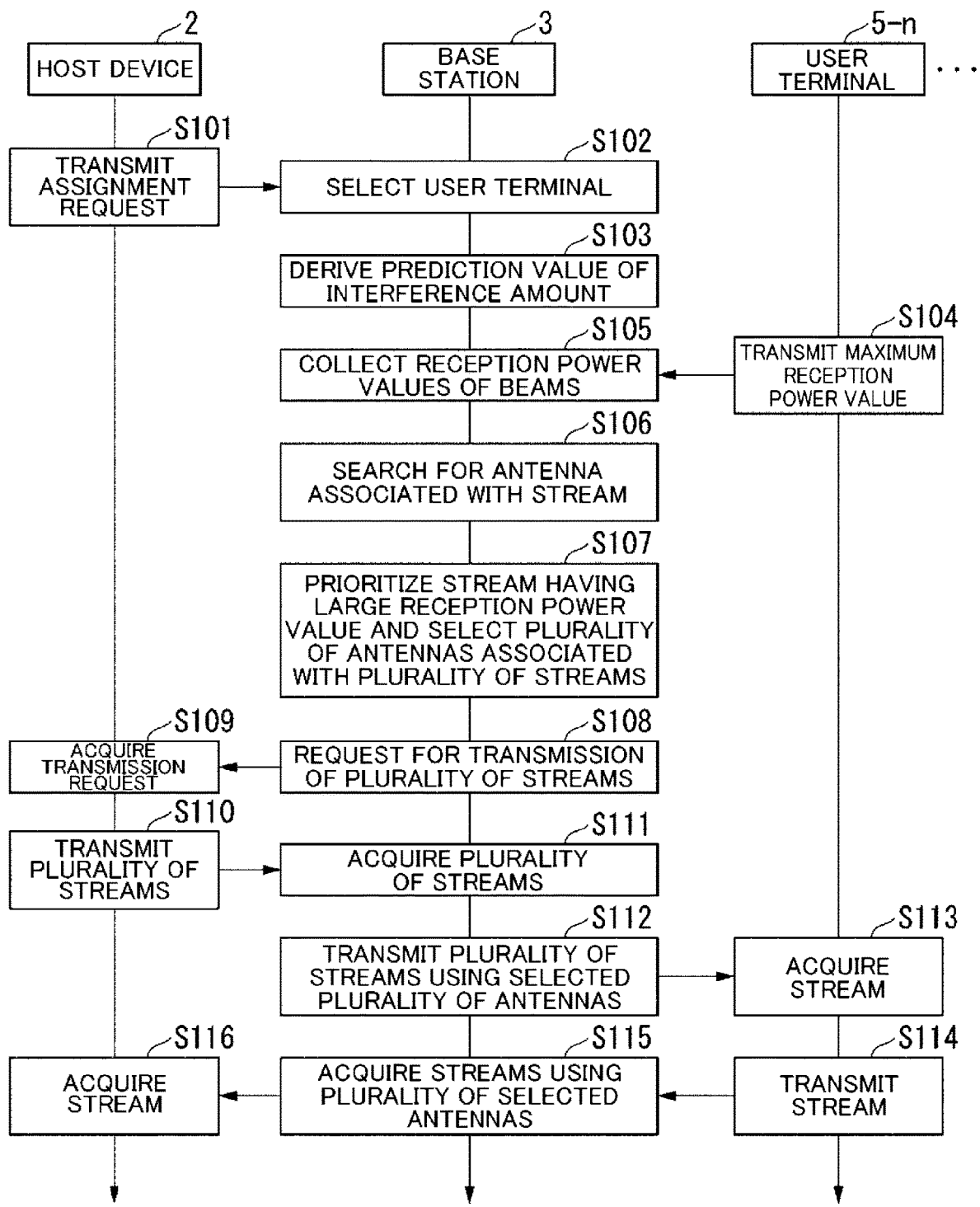
FIG. 3 is a sequence diagram showing an operation example of the wireless communication system according to the embodiment.

FIG. 3 is a sequence diagram showing an operation example of the wireless communication system 1. The host device 2 transmits the identifier of the stream addressed to the user terminal 5-$n$ ($n$ is an integer of 1 or more) to the base station 3 as the stream assignment request (step S101). The base station 3 selects one or more user terminals 5-$n$ to which the stream is assigned on the basis of the identifier of the stream (step S102). The base station 3 derives the prediction value of the interference amount between streams for one or more selected user terminals 5-$n$ (step S103).

When the prediction value of the interference amount between streams is less than the threshold value, the base station 3 requests one or more selected user terminals 5-$n$ to transmit the maximum reception power value. Each of the user terminals 5-$n$ transmits the reception power value of the beam transmitted from each antenna 4 to the base station 3 (step S104). The base station 3 collects the maximum reception power value of the beam transmitted from each antenna 4 from each user terminal 5-$n$ (step S105).

The base station 3 searches for the antenna 4 associated with the candidate of the stream 7 to be spatially multiplexed (step S106). The base station 3 prioritizes a stream having a large reception power value, and selects a plurality of antennas 4 associated with a plurality of streams 7 (step S107).

The base station 3 requests transmission of a plurality of streams (step S108). The host device 2 acquires a transmission request of a plurality of streams (step S109). The host device 2 transmits the plurality of requested streams to the base station 3 as a plurality of streams to be spatially multiplexed (step S110). The base station 3 acquires a plurality of streams to be spatially multiplexed (step S111).

The base station 3 uses the plurality of selected antennas 4 to transmit a stream group (a plurality of streams 7) that is spatially multiplexed to each user terminal 5-$n$ (step S112). Each user terminal 5-$n$ acquires the stream 7 addressed to its own terminal from the antenna 4 associated with the stream 7 (step S113).

The user terminal 5-$n$ may transmit an uplink stream to the antenna 4 associated with the uplink stream (step S114). The base station 3 acquires the uplink stream by using the plurality of selected antennas 4. The base station 3 transmits the uplink stream to the host device 2 (step S115). The host device 2 acquires the uplink stream from the base station 3 (step S116).

Figure 4:
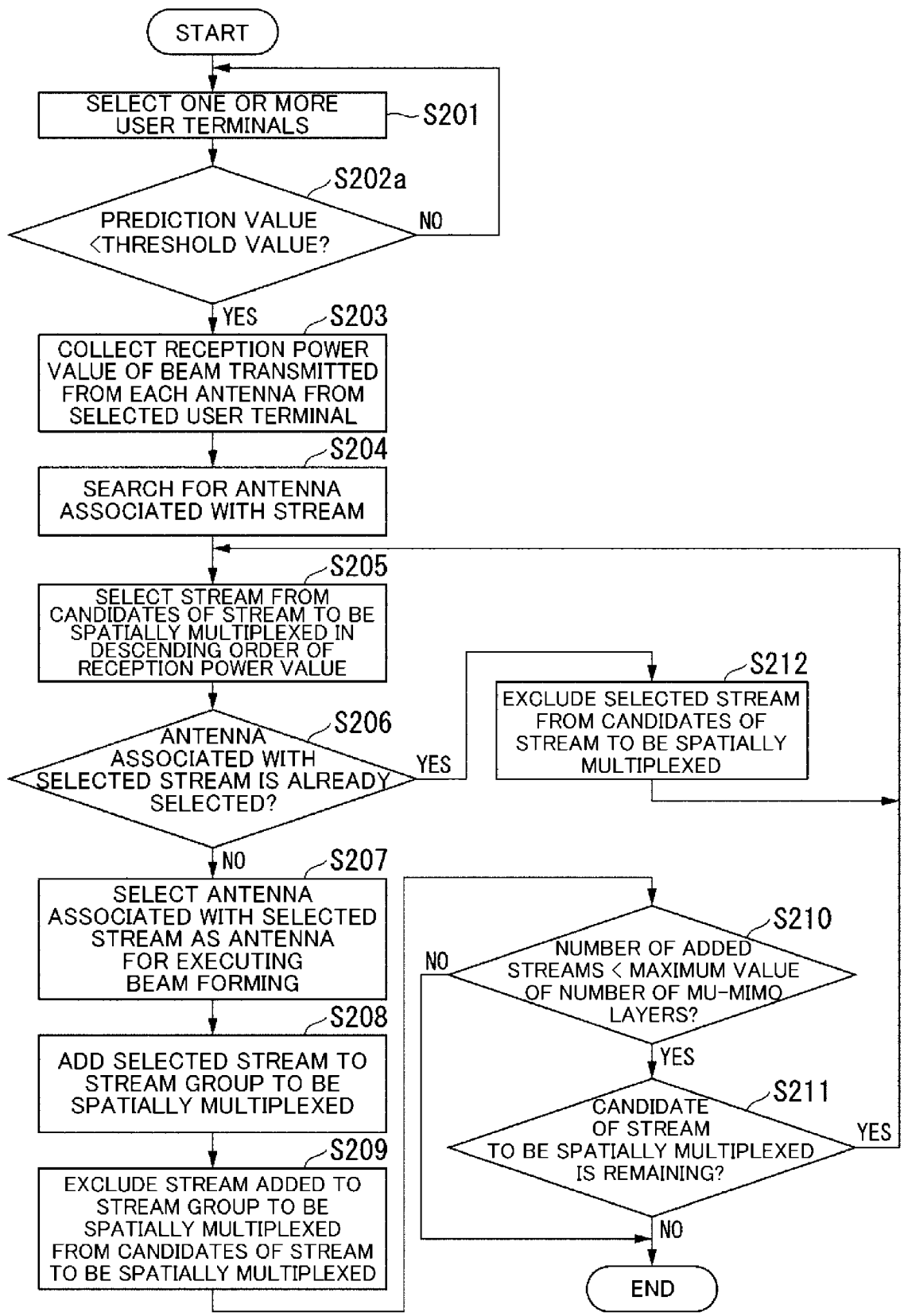
FIG. 4 is a flowchart showing an operation example of the wireless communication system according to the embodiment.

FIG. 4 is a flowchart showing an operation example of the wireless communication system 1 (a method of assigning the stream to each user terminal 5). The terminal selection unit 30 selects one or more user terminals 5 from among the plurality of user terminals 5 in the communication area (step S201). The prediction unit 31 derives the prediction value of the interference amount of the stream group transmitted from the plurality of antennas 4 for one or more selected user terminals 5. The collection unit 32 judges whether or not the prediction value of the interference amount of the stream group is less than the predetermined threshold value (step S202$a$).

When it is judged that the prediction value of the interference amount of the stream group is equal to or more than the predetermined threshold value (step S202$a$: NO), the collection unit 32 returns the processing to the step S201. When it is judged that the prediction value of the interference amount of the stream group is less than the predetermined threshold value (step S202$a$: YES), the collection unit 32 collects the reception power value of the beam transmitted from each antenna 4 included in all the antennas 4 arranged in the distributed manner from one or more selected user terminals 5 (step S203).

The antenna selection unit 33 searches for the antenna 4 associated with the candidate of the stream 7 to be spatially multiplexed (step S204). The antenna selection unit 33 selects the stream 7 from candidates of the stream 7 to be spatially multiplexed in the order of the larger reception power value (step S205). The antenna selection unit 33 judges whether or not the antenna 4-$m$ associated with the selected stream 7-$m$ (m is an integer equal to or greater than 1) is already selected. That is, the antenna selection unit 33 judges whether or not the antenna 4-$m$ associated with the selected stream 7-$m$ is assigned for transmission of another stream (step S206).

When it is judged that the antenna 4-$m$ associated with the selected stream 7-$m$ is not selected (step S206: NO), the antenna selection unit 33 selects the antenna 4-$m$ associated with the selected stream 7-$m$ as an antenna 4 for executing beam forming (step S207). The antenna selection unit 33 adds the selected stream 7-$m$ to the stream group 8 to be spatially multiplexed. For example, the antenna selection unit 33 adds the selected stream 7-$m$ to the stream group 8 to be spatially multiplexed (step S208).

The antenna selection unit 33 excludes the stream 7-$m$ added to the stream group 8 to be spatially multiplexed from candidates of the stream 7 to be spatially multiplexed. For example, the antenna selection unit 33 excludes the stream 7-$m$ added to the stream group 8 to be spatially multiplexed from candidates of the stream 7 to be spatially multiplexed (step S209).

The antenna selection unit 33 judges whether or not the number of streams 7 added to the stream group 8 to be spatially multiplexed is less than a maximum value of the number of layers of multi-user MIMO (for example, 8). That is, the antenna selection unit 33 judges whether or not the stream 7 can be further added to the stream group 8 to be spatially multiplexed (step S210).

When it is judged that the number of streams 7 added to the stream group 8 to be spatially multiplexed is equal to the maximum value of the number of layers of the multi-user MIMO (step S210: YES), the antenna selection unit 33 judges whether or not candidates of the stream 7 to be spatially multiplexed remain. That is, the antenna selection unit 33 judges whether or not the number of candidates of the stream 7 to be spatially multiplexed is 0 (step S211).

When it is judged that the number of streams 7 added to the stream group 8 to be spatially multiplexed is less than the maximum value of the number of layers of the multi-user MIMO (step S210: NO), the antenna selection unit 33 terminates the processing.

When it is judged that the candidates of the stream 7 to be spatially multiplexed remain (step S211: YES), the antenna selection unit 33 returns the processing to the step S205. When it is judged that there is no candidate for the stream 7 to be spatially multiplexed (step S211: NO), the antenna selection unit 33 terminates the processing.

In the step S206, when it is judged that the antenna 4-*m* associated with the selected stream 7-*m* is already selected (step S206: YES), the antenna selection unit 33 excludes the selected stream 7-*m* from candidates of the stream 7 to be spatially multiplexed (step S212). In addition, the antenna selection unit 33 returns the processing to the step S205.

As described above, the terminal selection unit 30 (terminal selector) selects one or more user terminals 5. The prediction unit 31 (predictor) derives the prediction value of the interference amount of the stream group transmitted from the plurality of antennas 4 for one or more selected user terminals 5. When the prediction value of the interference amount of the stream group is less than the threshold value, the collection unit 32 (collector) collects the reception power value of the beam 6 of the stream 7 included in the stream group 8 from one or more selected user terminals 5. The antenna selection unit 33 (antenna selector) selects a plurality of streams 7 in order of the reception power values of the beams of the streams. The antenna selection unit 33 selects a plurality of antennas 4 associated with the plurality of selected streams 7. The communication unit 34 (the transmission unit) (transmitter) transmits the plurality of selected streams 7 by beam forming using the plurality of selected antennas 4.

Thus, it is possible to improve the communication capacity (throughput) while suppressing the increase in the processing load. That is, the wireless communication system can improve communication capacity while suppressing an increase in processing load without collecting channel estimation values between each antenna and each user terminal. The reception power value is an index which is simpler than the channel estimation value (index of no higher processing load).

Modification Example

Figure 5:
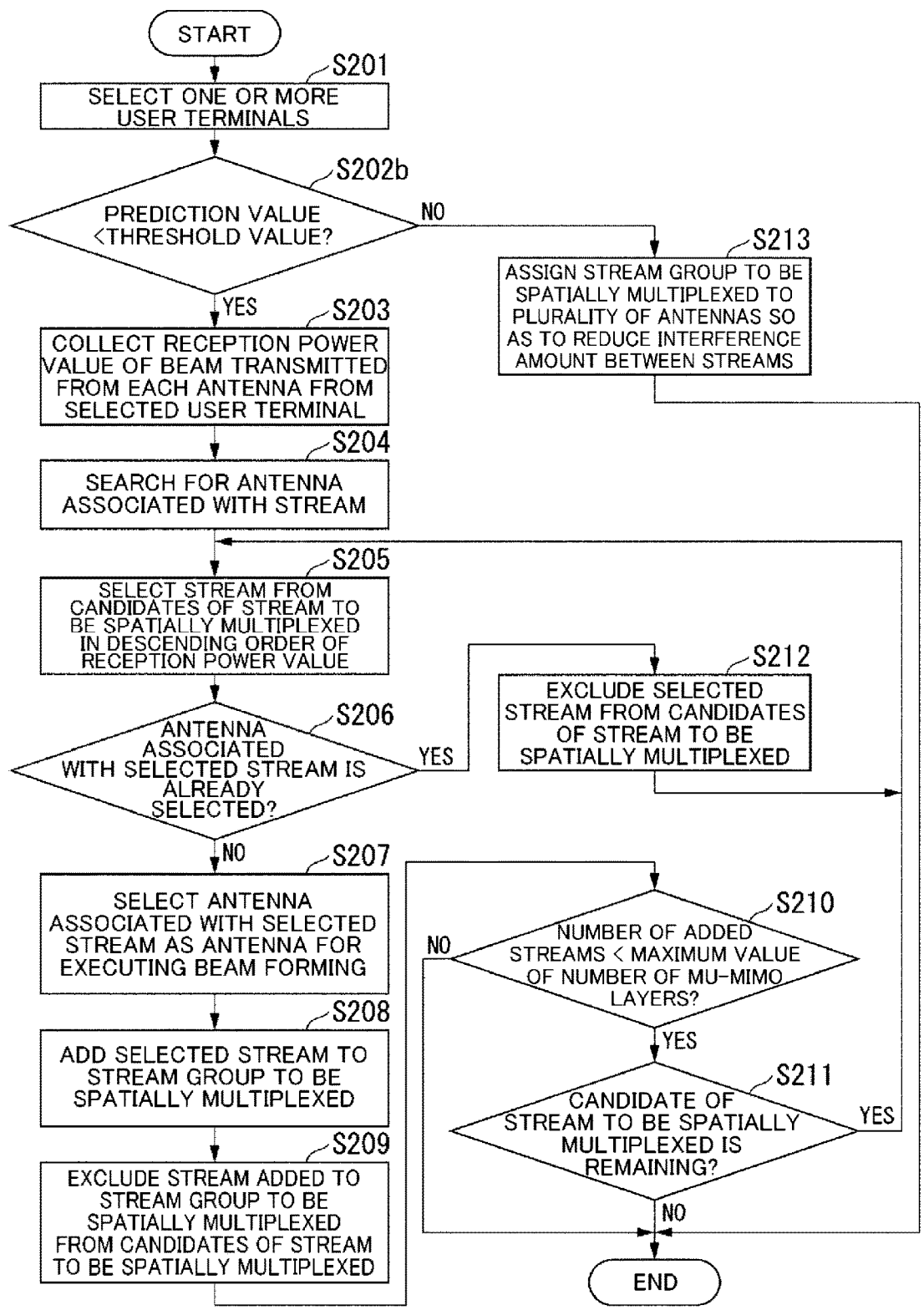
FIG. 5 is a flowchart showing an operation example of the wireless communication system according to a modification example of the embodiment.

FIG. 5 is a flowchart showing an operation example of the wireless communication system 1 according to a modification example of the embodiment. The step S201 shown in FIG. 5 is similar to the step S201 shown in FIG. 4.

The prediction unit 31 derives the prediction value of the interference amount of the stream group transmitted from the plurality of antennas 4 for one or more selected user terminals 5. The collection unit 32 judges whether or not the prediction value of the interference amount of the stream group is less than the predetermined threshold value (step S202*b*). When it is judged that the prediction value of the interference amount of the stream group is less than the predetermined threshold value (step S202*b*: YES), the collection unit 32 proceeds the processing to a step S203.

When it is judged that the prediction value of the interference amount of the stream group is equal to or more than the predetermined threshold value (step S202*b*: NO), the antenna selection unit 33 executes assignment (allocation) of the stream to the user terminal 5 by a predetermined method which is an assignment method in which the interference amount between the streams is taken into consideration and which is different from the assignment method shown in the first embodiment. That is, the antenna selection unit 33 assigns the stream group 8 to be spatially multiplexed to the plurality of antennas 4 on the basis of a predetermined condition so as to reduce the interference amount between the streams (step S213). The antenna selection unit 33 terminates the processing. The predetermined condition may be any condition as long as the interference amount between streams is reduced.

As described above, when it is judged that the prediction value of the interference amount of the stream group is equal to or more than the predetermined threshold value, the antenna selection unit 33 assigns the stream group 8 to be spatially multiplexed to the plurality of antennas 4 on the basis of the predetermined condition so as to reduce the interference amount between the streams. Accordingly, it is possible to improve the communication capacity while suppressing the increase of the processing load.

(Hardware Configuration)

Figure 6:
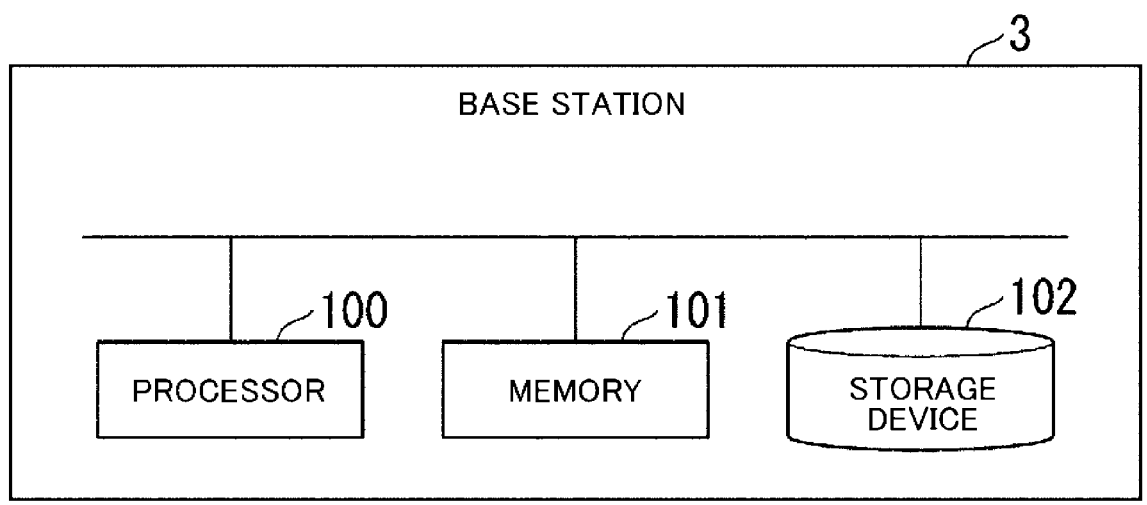
FIG. 6 is a diagram showing a hardware configuration example of the wireless communication apparatus according to the embodiment.

FIG. 6 is a diagram illustrating a hardware configuration example of the wireless communication apparatus according to the embodiment. A part or all of each functional unit of the base station 3 (the wireless communication apparatus) is implemented as software by a processor 100 such as a central processing unit (CPU) executing a program stored in a storage device 102 having a non-volatile recording medium (non-temporary recording medium) and a memory 101. The program may be recorded on a computer-readable recording medium. The computer-readable recording medium is, for example, a flexible disk, a magneto-optical disk, a portable medium such as a read only memory (ROM) or a compact disc read only memory (CD-ROM), or a non-temporary recording medium such as a storage device such as a hard disk built in a computer system.

A part or all of the functional units of the wireless communication system 1 may be implemented by using hardware including an electronic circuit or circuitry using, for example, a large scale integrated circuit (LSI), an application specific integrated circuit (ASIC), a programmable logic device (PLD), or a field programmable gate array (FPGA).

Although the embodiments of the present invention have been described in detail with reference to the drawings, specific configurations are not limited to these embodiments, and designs and the like within a range that does not deviating from the gist of the present invention are also included.

INDUSTRIAL APPLICABILITY

The present invention is applicable to a distributed antenna system that executes single user MIMO (SU-MIMO) and multi-user MIMO (MU-MIMO).

REFERENCE SIGNS LIST

1 Wireless communication system
2 Host device
3 Base station
4 Antenna
5 User terminal
6 Beam
7 Stream
8 Stream group
9 Stream group
30 Terminal selection unit
31 Prediction unit
32 Collection unit
33 Antenna selection unit
34 Communication unit
100 Processor 101 Memory
102 Storage device

The invention claimed is:

1. A wireless communication apparatus, comprising:
   a terminal selector configured to select one or more user terminals;
   a predictor configured to derive a prediction value of an interference amount of a stream group transmitted from a plurality of antennas for the selected one or more user terminals;
   a collector configured to, when the prediction value of the interference amount is less than a threshold value, collect reception power values of beams of a plurality of streams included in the stream group from the selected one or more user terminals;
   an antenna selector configured to select the plurality of streams in descending order of the reception power values and select the plurality of antennas associated with the plurality of selected streams; and
   a transmitter configured to transmit the plurality of selected streams by beam forming using the plurality of selected antennas.

2. The wireless communication apparatus according to claim 1, wherein the predictor derives the prediction value of the interference amount between the plurality of streams on a basis of a combination of the plurality of antennas and the plurality of streams to be transmitted.

3. The wireless communication apparatus according to claim 1, wherein the predictor derives the prediction value of the interference amount between the plurality of streams on a basis of a positional relationship between the plurality of antennas and a beam width corresponding to a number of antenna elements for each of the antennas.

4. The wireless communication apparatus according to claim 1, wherein the terminal selector selects the one or more user terminals on a basis of a rank index and a predetermined scheduling processing.

5. The wireless communication apparatus according to claim 1, wherein the terminal selector selects the one or more user terminals on a basis of proportional fairness and a predetermined scheduling processing.

6. The wireless communication apparatus according to claim 1, wherein the terminal selector selects the one or more user terminals in order from user terminals having high reception power of the plurality of streams transmitted from the plurality of antennas.

7. The wireless communication apparatus according to claim 1, wherein the terminal selector selects the one or more user terminals having similar reception power value of beam of the plurality of streams transmitted from the plurality of antennas.

8. A wireless communication method performed by a wireless communication apparatus, the wireless communication method comprising:
   selecting one or more user terminals;
   deriving a prediction value of an interference amount of a stream group transmitted from a plurality of antennas for the selected one or more user terminals;
   collecting, when the prediction value of the interference amount is less than a threshold value, reception power values of beams of a plurality of streams included in the stream group from the selected one or more user terminals;
   selecting the plurality of streams in descending order of the reception power values and selecting the plurality of antennas associated with the plurality of selected streams; and
   transmitting the plurality of selected streams by beam forming using the plurality of selected antennas.

* * * * *